US012645743B2

(12) United States Patent
Al-Shehab et al.

(10) Patent No.: US 12,645,743 B2
(45) Date of Patent: *Jun. 2, 2026

(54) COMPUTER-BASED SYSTEMS CONFIGURED FOR GENERATING SEARCH QUERIES FOR A SEARCH ENGINE AND METHODS OF USE THEREOF

(71) Applicant: Capital One Services, LLC, McLean, VA (US)

(72) Inventors: Ali S. Al-Shehab, Medford, MA (US); Jr-Wei Jeng, Marlboro, NJ (US); Niti N. Sheth, Edison, NJ (US); Tanveer Afzal Faruquie, Scarsdale, NY (US); David Edward Lutz, Tarrytown, NY (US); Nathan L. Sheridan, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,292

(22) Filed: Feb. 21, 2025

(65) Prior Publication Data

US 2025/0291861 A1 Sep. 18, 2025

Related U.S. Application Data

(63) Continuation of application No. 18/602,759, filed on Mar. 12, 2024, now Pat. No. 12,254,053.

(51) Int. Cl.
| | |
|---|---|
| *G06F 16/90* | (2019.01) |
| *G06F 16/14* | (2019.01) |
| *G06F 16/951* | (2019.01) |
| *G06F 16/9532* | (2019.01) |

(52) U.S. Cl.
CPC ........ *G06F 16/9532* (2019.01); *G06F 16/152* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 11,215,516 B2 | 1/2022 | Obata | |
| 11,243,967 B2 | 2/2022 | Fuerst et al. | |
| 12,061,970 B1 * | 8/2024 | Lo | G06N 3/10 |
| 2014/0200166 A1 | 7/2014 | Van Rooyen et al. | |

* cited by examiner

*Primary Examiner* — Jau Shya Meng
(74) *Attorney, Agent, or Firm* — GREENBERG TRAURIG, LLP

(57) ABSTRACT

A method may include executing an entity resolution microservice programmed to receive an entity-specific data request for entity-specific data for an entity from a plurality of entities. An application programming interface (API) call is transmitted to an entity profile database that programs the entity profile database to identify entity-specific data in data records matching the entity-specific data in the entity-specific data request and transmit to the entity resolution microservice a compressed representation of the entity-specific data identified in the at least one entity profile database. The compressed representation may be received and the compressed representation may be transformed to an uncompressed representation. An entity-specific database query request for a search engine to perform a database search for additional entity-specific data is generated based on the uncompressed representation.

20 Claims, 6 Drawing Sheets

300

Receive an entity-specific data request for entity-specific data associated at least one entity from a plurality of entities
310

Transmit over a communication network, in response to the entity-specific data request, an application programming interface (API) call, including at least one entity-specific data-size-reducing hash function, to at least one entity profile database 320 where the API call programs the at least one entity profile database to:
identify entity-specific data in data records in the at least one entity profile database matching the entity-specific data in the entity-specific data request associated with the at least one entity, and
transmit to the entity resolution microservice over the communication network, a compressed representation of the entity-specific data identified in the at least one entity profile database generated using the at least one entity-specific data-size-reducing hash function Receive the compressed representation from the at least one entity profile database 340

Transform the compressed representation to an uncompressed representation using the at least one entity-specific data-size-reducing hash function 350

Generate an entity-specific database query request for a search engine to perform a real time database search for additional entity-specific data associated with the at least one entity based at least in part on the plurality of entity-specific features in the uncompressed representation 360

Original REQUEST      <u>200</u>

```
{
   "id": "abc123456",
   "businessName": ["Joe's Pizza INC",
"JOSEPH'S pizzeria", "Joe PIZZA"],
   "businessAddress": [],
   "standardizedBusinessAddresses": [
      {
      "addressLine1": "1405 jason ln",
      "city": "",
      "stateCode": "",
      "postalCode": "62450",
      "latitude": null,
      "longitude": null
      }
   ],
   "sic4Code": "5812",
   "naics6Code": null,
   "executiveNames": ["tony trupiano",
"TONY T", "Trupiano T"],
   "businessTelephoneNumbers":
["6183928551", "1234567"],
   "minMatchConfidence": "",
   "maxNumberOfResults" : 1
}
```

FIG. 2A

Cleansed and standardized REQUEST     <u>210</u>

```
{
   "APPLICATION_ID": "7adc52f2-17d0-49db-8cdb-abe40360c1d4",
   "BUSINESS_NAMES": ["Joe's Pizza INC", "JOSEPH'S pizzeria"],
   "CLEAN_BUSINESS_NAMES": ["joe s pizza", "joseph s pizzeria"],
   "CLEAN_BUSINESS_NAME_TRIGRAMS": [["_j", "jo", "joe", "oe_", "__s",
"_s_", "_p", "_pi", "piz", "izz", "zza", "za_"], ["__j", "_jo",
"jos", "ose", "sep", "eph", "ph_", "__s", "_s_", "__p", "_pi",
"piz", "izz", "zze", "zer", "eri", "ria", "ia_"]],
   "BUSINESS_ADDRESSES": [
      {"AddressLine1": "1405 jason ln",
       "AddressLine2": "",
       "City": "olney",
       "State": "IL",
       "Zip": "62450",
       "Latitude": 38.745,
       "Longitude": -88.068
      }
   ],
   "EXECUTIVE_NAMES": ["tony, trupiano", "TONY T"],
   "EXECUTIVE_NAME_TRIGRAMS": [["_t", "_to", "ton", "ony", "ny_",
"__t", "_tr", "tru", "rup", "upi", "pia", "ian", "ano", "no_"],
["__t", "_to", "ton", "ony", "ny_", "__t", "_t_"]],
   "PHONE_NUMBERS": ["6183928551", "1234567"],
   "VALID_PHONE_NUMBERS": ["6183928551"],
   "MAX_FRANCHISE": "1",
   "MIN_ZIP_LOG": "1.0",
   "NAICS6_CODE": "",
   "SIC4_CODE": "5812"
}
```

FIG. 2B

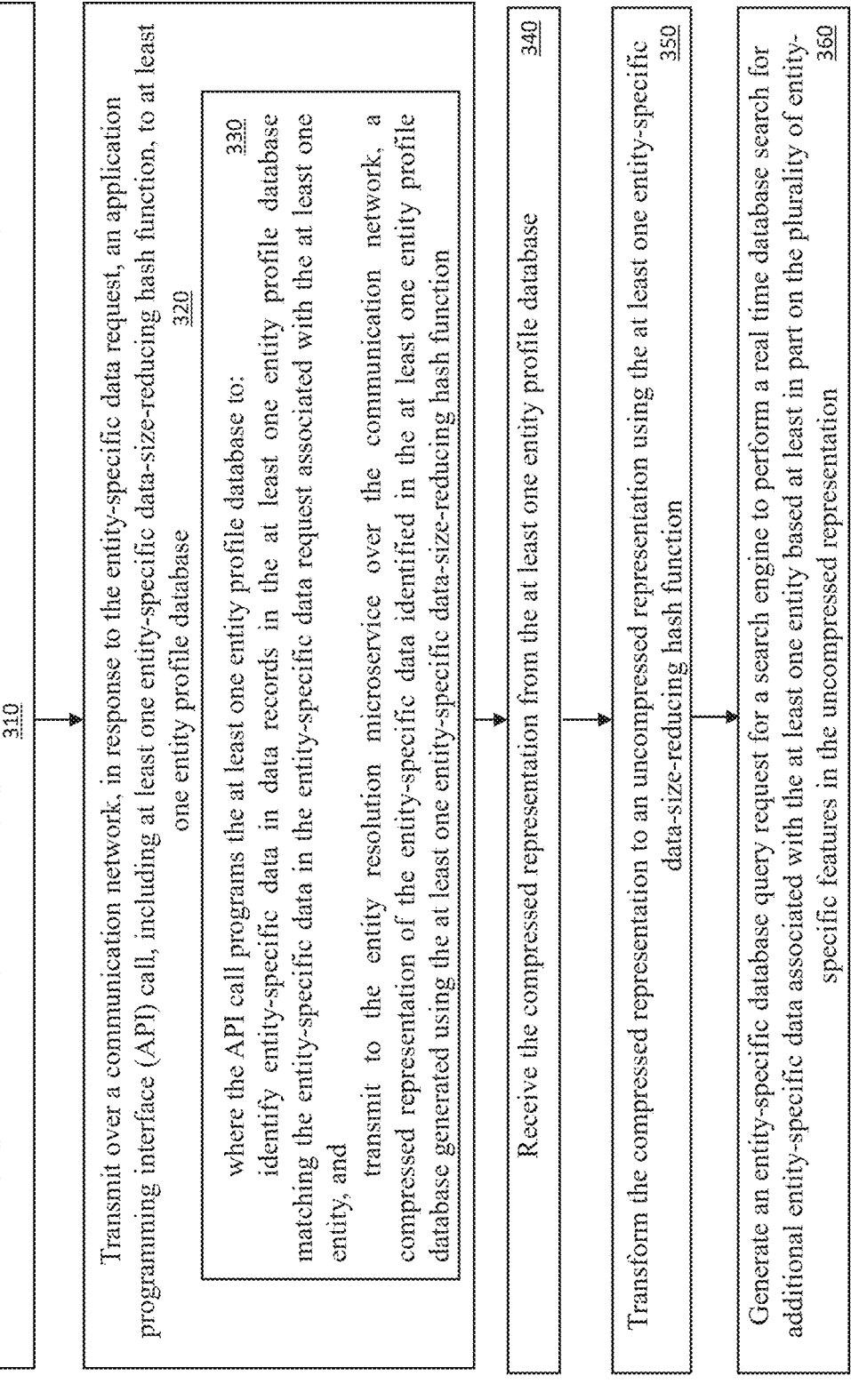

300

Receive an entity-specific data request for entity-specific data associated at least one entity from a plurality of entities
310

Transmit over a communication network, in response to the entity-specific data request, an application programming interface (API) call, including at least one entity-specific data-size-reducing hash function, to at least one entity profile database
320 where the API call programs the at least one entity profile database to:    330 identify entity-specific data in data records in the at least one entity profile database matching the entity-specific data in the entity-specific data request associated with the at least one entity, and transmit to the entity resolution microservice over the communication network, a compressed representation of the entity-specific data identified in the the at least one entity profile database generated using the at least one entity-specific data-size-reducing hash function Receive the compressed representation from the at least one entity profile database
340

Transform the compressed representation to an uncompressed representation using the at least one entity-specific data-size-reducing hash function
350

Generate an entity-specific database query request for a search engine to perform a real time database search for additional entity-specific data associated with the at least one entity based at least in part on the plurality of entity-specific features in the uncompressed representation
360

FIG. 3

COMPUTER-BASED SYSTEMS CONFIGURED FOR GENERATING SEARCH QUERIES FOR A SEARCH ENGINE AND METHODS OF USE THEREOF

FIELD OF TECHNOLOGY

The present disclosure generally relates to computer-based systems configured for generating search queries for a search engine and methods of use thereof.

BACKGROUND OF TECHNOLOGY

A computer system may include a group of computers and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of executing, by at least one processor, an entity resolution microservice that may be programmed to receive an entity-specific data request for entity-specific data associated at least one entity from a plurality of entities. Entity-specific data for each of the plurality of entities may be stored in a plurality of databases. An application programming interface (API) call, including at least one entity-specific data-size-reducing hash function, may be transmit over a communication network, in response to the entity-specific data request, to at least one entity profile database. The at least one entity-specific data-size-reducing hash function may be configured to cluster entity-specific features from a plurality of entity-specific features substantially matching the entity-specific data associated with the at least one entity. The API call may program the at least one entity profile database to identify entity-specific data in data records in the at least one entity profile database matching the entity-specific data in the entity-specific data request associated with the at least one entity, and transmit to the entity resolution microservice over the communication network, a compressed representation of the entity-specific data identified in the at least one entity profile database generated using the at least one entity-specific data-size-reducing hash function. The compressed representation from the at least one entity profile database may be received. The compressed representation may be transformed to an uncompressed representation using the at least one entity-specific data-size-reducing hash function. An entity-specific database query request may be generated for a search engine to perform a real time database search for additional entity-specific data associated with the at least one entity based at least in part on the plurality of entity-specific features in the uncompressed representation.

In some embodiments, the present disclosure provides an exemplary technically improved computer-based platform that includes at least the following components of a plurality of processors and a plurality of non-transient computer memories storing a plurality of computing instructions. When executing the plurality of computing instructions, at least one processor from the plurality of processors may be programmed to execute an entity resolution microservice. The entity resolution microservice may be programmed to receive an entity-specific data request for entity-specific data associated at least one entity from a plurality of entities. Entity-specific data for each of the plurality of entities may be stored in a plurality of databases. An application programming interface (API) call, including at least one entity-specific data-size-reducing hash function, may be transmit over a communication network, in response to the entity-specific data request, to at least one entity profile database. The at least one entity-specific data-size-reducing hash function may be configured to cluster entity-specific features from a plurality of entity-specific features substantially matching the entity-specific data associated with the at least one entity. The API call may program the at least one entity profile database to identify entity-specific data in data records in the at least one entity profile database matching the entity-specific data in the entity-specific data request associated with the at least one entity, and transmit to the entity resolution microservice over the communication network, a compressed representation of the entity-specific data identified in the at least one entity profile database generated using the at least one entity-specific data-size-reducing hash function. The compressed representation from the at least one entity profile database may be received. The compressed representation may be transformed to an uncompressed representation using the at least one entity-specific data-size-reducing hash function. An entity-specific database query request may be generated for a search engine to perform a real time database search for additional entity-specific data associated with the at least one entity based at least in part on the plurality of entity-specific features in the uncompressed representation.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2A is an exemplary screenshot of an entity-specific data request in accordance with one or more embodiments of the present disclosure;

FIG. 2B is an exemplary screenshot of a pre-processed entity-specific data request in accordance with one or more embodiments of the present disclosure;

FIG. 3 is a flowchart of a method for generating search queries for a search engine in accordance with one or more embodiments of the present disclosure.

DETAILED DESCRIPTION

Figure 1:
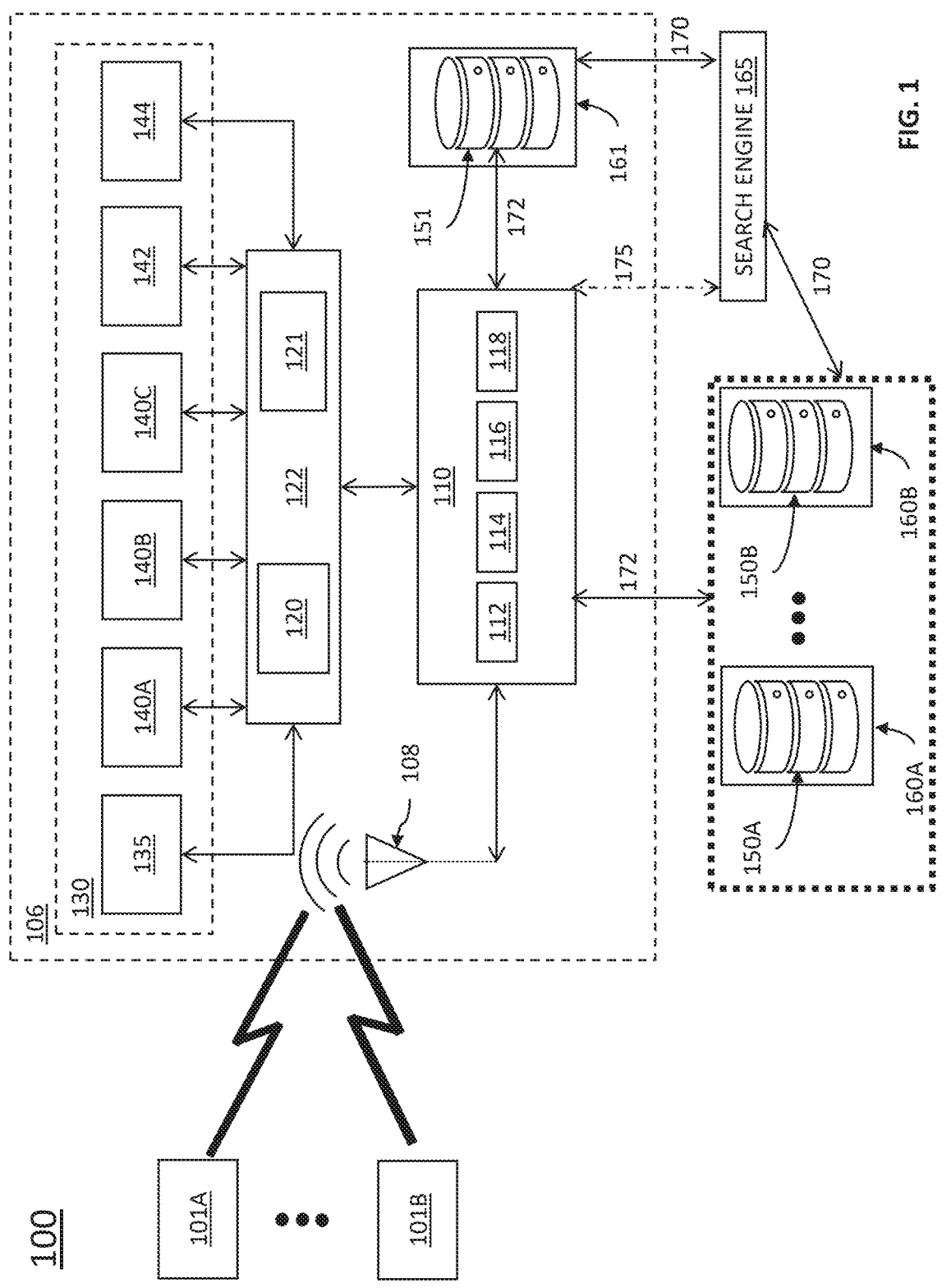
FIG. 1 is a block diagram of a computing system for generating search queries for a search engine in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

In at least some embodiments, the present disclosure is directed to exemplary real-time entity-resolution (RTER) microservice(s) that may be configured to update entity-specific data, such as business data, stored in an entity profile of an entity, such as for example, a business profile of a particular business. When a user may want to update the business data in a stored business profile, the RTER microservice may query a search engine, such as ElasticSearch™ (Elasticsearch B.V, San Francisco, CA), for example, to search and retrieve any new or additional entity-specific data to update the entity profile. In at least some embodiments, the entity-specific data may be located in a plurality of databases, such as public databases, social media databases, and/or any suitable database, for example, that are stored in a plurality of electronic resources and communicatively coupled to the RTER microservice platform. In at least some embodiments, these databases may be queried to identify additional or new entity-specific data based on the information in the query and relay the additional or new entity-specific data to the RTER microservice platform for updating in the entity profile.

In at least some embodiments, the present disclosure may be directed to addressing a technological problem with electronic querying since a typical search engine query such as an ElasticSearch search query, for example, may result in too much search data results (e.g., thousands of hits) being retrieved by the search engine preventing a real-time update of the entity profile using the new and/or additional entity-specific data associated with the particular entity if the search engine query might not limit search results hits. Many of the search result hits may not be even related to the entity but nevertheless, the system may need to process these extraneous search results.

At least some embodiments of the present disclosure herein disclose illustrative computer-based systems configured for generating search queries for a search engine and methods of use thereof. For easier processing of the search engine results, a search engine query-generation algorithm may be configured to output a specially crafted entity-specific database query request to limit the quantity of search results returned by a search engine in response to an entity-specific data request for providing a real-time update of an entity profile with search results from the plurality of databases. The extraneous search results may thus be reduced by the methods herein disclosed.

FIG. 1 is a block diagram of a computing system 100 for generating search queries for a search engine 165 in accordance with one or more embodiments of the present disclosure. Aspects of the present disclosure may be applied to any embodiment for an RTER microservices platform 106 that may include RTER software modules denoted 135, 140A, 140B, and 140C for implementing the RTER microservices in a service layer 130 as described hereinbelow. At least one search query generator software module 142 may be configured to generate of search queries in response to an entity-specific data request for entity-specific data from a user via a graphical user interface (GUI).

In some embodiments, the RTER microservices platform 106 may include a multi-layered architecture including, for example, the service layer 130, an orchestration layer 122, and a platform layer 110, however other layers may be additionally contemplated. In some embodiments, a plurality of users may interact with the RTER microservices platform 106 via any of N user devices denoted 101A . . . 101B, where N may be an integer. The N user devices denoted 101A 101B may include the GUI for any number of users to interact with the RTER microservices platform 106. FIG. 1 shows the first user device 101A and the Nth user device 101B. Communications from the user devices 101A . . . 101B may be received by a transceiver 108 and may then be routed to an appropriate component of the system, via the platform layer 110, for example.

In some embodiments, the platform layer 110 may include an input/output (I/O) interface 112 for facilitating data communication to external devices, such as, e.g., the transceiver 108 with any other system devices. The platform layer 110 may also include a runtime environment 114 for implementing programs, services, functionalities and microservices using a plurality of processors 116 and memory devices 118 for implementing the RTER microservices platform 106. The memory devices 118 may include, e.g., temporary storage and caching of data to facilitate resources of the RTER microservices platform 106. In some embodiments, the platform layer 110 includes functionality for, e.g., configuration management, logging and monitoring of data traffic, document management, communication routing, notifications, messaging tools, reporting tools, as well as any other functions pertaining to platform level functionality.

In some embodiments, a request from any of the user devices 101A and 101B may be routed to an orchestrator 120 in the orchestration layer 122. In other embodiments, the orchestrator 120 may manage operations of the RTER microservices platform 106, including allocation of resources, process schedule with, e.g., the plurality of processors 116, among other tasks. For example, in some embodiments, the orchestrator 120 may include a plurality of application programming interfaces (APIs) 121 for calling services and functions of the RTER microservices platform 106 in interacting with the user devices 101A . . . 101B.

In some embodiments, the orchestrator 120 may manage operations of microservices in a service layer 130 and coordination of the service layer 130 with the platform layer 110. For example, the service layer 130 may include software modules 135, 140A, 140B, and 140C related to, for example, implementing the RTER microservices platform 106 and the at least one search query generator software module 142 to generate search queries for the search engine 165. In some embodiments, the orchestrator 120 may facilitate aggregation of data from multiple domains in the service layer 130 and/or may orchestrate data-related operations across domains and services to provide for complete experiences within any given domain.

In some embodiments, the service layer 130 may also include at least one shared microservice 144 that may include functionality that may be shared across multiple domains.

In some embodiments, the orchestrator 120 may manage the data flow and the execution of microservices such that data may be shared, processed, and returned to any of the N user devices 101A . . . 101B. For example, a user device such as the user device 101A may communicate a request, e.g., a user interaction via a GUI of the user device 101A. The request may be received by the transceiver 108 and routed via the platform layer 110 to the orchestrator 120. A search request may be entered by the user into the GUI on a particular user device from any of the N user devices 101A . . . 101B and the search results may be displayed in the GUI of the particular user device for the user to analyze.

In some embodiments, the computing system 100 may include a plurality of M electronic resources denoted 160A . . . 160B on which a plurality of M databases may be stored and respectively denoted as 150A . . . 150B where M may be an integer. An additional electronic resource 161 may include an entity profile database 151. The plurality of M electronic resources 160A . . . 160B and the additional electronic resource 161 may be communicatively coupled 172 to the RTER microservices platform 106.

In some embodiments, the plurality of M databases 150A . . . 150B may include the entity profile database 151. In other embodiments, the entity profile database 151 may be separate from the plurality of M databases 150A . . . 150B. In yet other embodiments, In other embodiments, the entity profile database 151 may be separate from, but communicatively coupled to the plurality of M databases 150A . . . 150B.

In some embodiments, the RTER microservices platform 106 may be communicatively coupled 175 to send and receive data to a search engine 165.

In some embodiments, the plurality of M electronic resources 160A . . . 160B and the additional electronic resource 161 may be communicatively coupled 170 with the search engine 165.

In some embodiments, the search engine 165 may be an Elasticsearch search engine. The Elasticsearch search engine may be based on a Lucene library. It may be a distributed, multitenant-capable full-text search engine with a HTTP web interface and schema-free JSON documents.

In some embodiments, any data stored on any of the plurality of databases 150A . . . 150B, such as entity-specific data associated with any of a plurality of entities may be accessible from the N user devices 101A . . . 101B via any of the plurality of APIs in the orchestrator 120 in the RTER microservices platform 106. User access may require proper user access authentication.

In some embodiments, each of plurality of M electronic resources (ER) denoted 160A 160B may include at least one ER processor and/or ER controller, ER input and/or ER output devices, and/or ER communication circuitry for communicating over a communication network with any of the elements and/or devices in the computing system 100. API calls via any of the plurality of APIs 121 to the at least ER processor and/or ER controller may be programmed to search for and/or process entity-specific data stored in any of the plurality of M databases.

In some embodiments, for efficient processing of initial business data for generating the ElasticSearch search query, API calls to an entity profile database 151 stored in an electronic resource 161 may include data-reducing hashing functions to reduce the size of the initial business data for a particular business that may be returned to the microservice as compress data. The entity-specific data in the entity profile database 151 may then be decompressed by the original hash function and/or by algorithms based on the hash function used in the original API calls. Moreover, the hash function algorithms may cluster business data features from the compress data. These clustered features may be used by the algorithms to generate an ElasticSearch query that streamlines the search coverage.

In some embodiments, the entity profile database 151 from the plurality of M databases 150A . . . 150B may be stored on the electronic resource 161 from the plurality of electronic resources coupled to the microservice RTER platform 106 and/or may require authentication to access.

In some embodiments, the entity profile database 151 may be separate from the plurality of M databases 150A . . . 150B and may be directly assessable from the microservice RTER platform 106 as shown in FIG. 1.

FIG. 2A is an exemplary screenshot of an entity-specific data request 200 in accordance with one or more embodiments of the present disclosure. A user may enter into a GUI at any one of the N user devices 101A . . . 101B, the entity-specific data request 200. The entity-specific data request 200 may be an exemplary request from a user for more entity-specific information having initial entity profile information about Joe's Pizza on 1405 Jason Lane, for example. The entity-specific data request 200 for entity-specific data may include a number of fields such as the business name, address, city, state, and postal code, executive names, telephone numbers, a Standard Industrial Classification Codes (SIC Codes) to identify the primary line of business of the entity (sic4Code), and/or a (naics6code) North American Industry Classification System (NAICS) code for classifying business establishments for the purpose of collecting, analyzing, and publishing statistical data.

FIG. 2B is an exemplary screenshot of a pre-processed entity-specific data request 200 in accordance with one or more embodiments of the present disclosure. A pre-processing module 135 may provide additional data cleaning and standardization as shown in the pre-processed entity-specific data request 210 relative to the entity-specific data request 200. For example, the pre-processed entity-specific data request 210 may include business trigrams and/or executive name trigrams which when used in the entity-specific database query request to the search engine 165 such as ElasticSearch. These trigrams, for example, may cause the search engine 165 to return a large number of search results hits, most of which with extraneous data that may prevent the update of the entity profile in real-time with the new or additional entity-specific data in the returned search results.

The embodiments hereinbelow describe two exemplary flows for managing a quantity of search engine results (e.g., the quantity of data in search engine hits) to extract the entity-specific data for a real-time update of the entity profile of a desired entity. The first exemplary flow discloses applying blocking rules to limit the amount of search result data obtained from the search engine 165 such as ElasticSearch by extracting features from the received entity-specific data matching the entity-specific data request, grouping the matched data into matching pairs and then applying the blocking rules. The matching pairs after the blocking rules are applied may be scored as described hereinbelow.

In some embodiments, a second exemplary flow may leverage an application programming interface (API) call that may include at least one entity-specific data-size-reducing hash function, to remotely program the at least one entity profile to return a compressed representation of the entity-specific data for a particular entity in a compressed format. The microservice RTER platform 106 may use the data in the compressed representation to generate an entity-specific database query request for the search engine 165, such as ElasticSearch for example as described in detail hereinbelow, for example in FIGS. 3, 4A and 4B.

In some embodiments, a first exemplary flow for managing the search engine results may include the pre-processed entity-specific data request 210 that may be relayed to the microservice RTER platform 106 for processing by the software modules 135, 140A, 140B, and 140C. The RTER software modules may include a blocking module 140A, a featurizer module 140B, and/or a scoring module 140C.

In some embodiments, the data in the pre-processed entity-specific data request 210 may be used in an entity-specific database query for the search engine 165 to query both the entity profile database 151 and the plurality of M databases denoted by 150A . . . 150B. The entity profile database may include entity profiles of over at least 100 million entities that may be loaded into the search engine cluster (e.g., ElasticSearch cluster). With this quantity of entities, the microservice RTER platform 106 may take hours to find matches with the original search request.

In some embodiments, blocking algorithms and/or rules may be applied by the blocking module 140A to the search engine 165 to narrow down the number of entities in the entity database that the search engine query may be applied and/or may be used to filter matching pair results between the entity-specific data in the identified records in the search results and the entity-specific information in the search query (e.g., the entity-specific database query).

In some embodiments, the first exemplary flow for managing the search engine results may further include the featurizer module 140B that may be configured to calculate a predetermined number of features for each of the matching pairs by converting the raw data from the blocking module 140A into numerical values. These numerical values may be used to determine similarity between matches.

In some embodiments, an exemplary list of features from the featurizer module 140B may include but are not limited to:

(1) biz_name_same_soundex_max (maximum of whether two biz names have the same soundex out of all biz name combinations)

(2) biz_name_max (Maximum of all trigram similarity of all pairs of business name combinations (on business can have multiple names)

(3) exec_name_max (trigram similarity between the two executive/business owner names)

(4) exec_biz_name_max (cross trigram similarity between the owner names and the biz names)

(5) phone_max (if there is an exact phone match between the two businesses)

(6) address_sim_max (levels of similarity of business/mailing addresses between the two businesses)

(7) industry_max (matching levels of two biz industries based on a SIC4 code)

(8) legal_name_sum (whether a business name is a legal name)

(9) works_at_max (distinguishes business pairs to match a doctor working at a hospital for example)

(10) franchise_max (if either of the businesses in the matching pair is a franchise)

(11) zip_log_min (natural log oft the number of zip codes associated with the business name with natural log operation)

In some embodiments, the first exemplary flow for managing the search engine results may further include the scoring module 140C applying a trained machine learning model (TMLM) such as XGBoost to produce matching scores between 0 and 1 based on the features previous calculated in the featurizer module 140B. the TMLM may determine the most important features and may rank all of the matching pairs accordingly based on the matching scores.

As a non-limiting example, suppose that the entity name (e.g., business name) in the entity-specific data request is "Gil Ellis". The search engine, for example, may return "Elijah Home Investments", "Ellis Automotive" and "Ellis Gilbert". These business name features may be inputted into the scoring module 140C which may output matching scores (MS) such as for example "Elijah Home Investments" MS=0.084, "Ellis Automotive" MS=0.023 and "Ellis Gilbert" MS=0.934. If the entity name in search query was "Gil Ellis", then "Ellis Gilbert" may be the best match with a highest matching score of 0.934. The worst match outputted from the scoring module 140C may be "Ellis Automotive" with a lowest matching of 0.023. This example may be applicable to the first and second exemplary flows for managing the search engine results as described herein.

In some embodiments, the first exemplary flow for managing the search engine results may further include the orchestrator 120 may join the blocking module 140A output and the scoring module 140C output and may transmit all of the matching pairs, their matching scores, entity (business) firmographics, and/or transaction data to the user on one of the N user devices 101A . . . 101B.

In some embodiments, a second exemplary flow for managing the search engine results may further include all of the functionality of the featurizer module 140B, and/or the scoring module 140C as described herein above. However, to more efficiently manage the search engine results before receiving the search results, the at least one search query generator software module 142 may include an algorithm to take the data in the entity-specific data request to generate the entity-specific database query request that may be crafted to reduce extraneous search results hits.

In some embodiments, any of the functionalities of the various software modules in the first exemplary flow for managing the search engine results may be used interchangeably in the second exemplary flow for managing the search engine results, and vice versa.

FIG. 3 is a flowchart of a method 300 for generating search queries for the search engine 165 in accordance with one or more embodiments of the present disclosure. The method 300 may be performed by any of the plurality of processors 116 for implementing the RTER microservices platform 106 by executing the associated software modules such as the at least one search query generator software module 142 and describes a generation of the entity-specific database query request for a search engine, such as ElasticSearch, in the second exemplary flow for managing the search engine results.

In some embodiments, the method 300 may include receiving 310 an entity-specific data request for entity-specific data associated at least one entity from a plurality of entities.

In some embodiments, the method 300 may include transmitting 320 over a communication network, in response to the entity-specific data request, an application programming interface (API) call, including at least one entity-specific data-size-reducing hash function, to at least one entity profile database. The API call may program 330 the at least one entity profile database to: (1) identify entity-specific data in data records in the at least one entity profile database matching the entity-specific data in the entity-specific data request associated with the at least one entity, and (2) transmit to the entity resolution microservice over the communication network, a compressed representation of the entity-specific data identified in the at least one entity profile database generated using the at least one entity-specific data-size-reducing hash function.

In some embodiments, the method 300 may include receiving 340 the compressed representation from the at least one entity profile database.

In some embodiments, the method 300 may include transforming 350 the compressed representation to an uncompressed representation using the at least one entity-specific data-size-reducing hash function.

In some embodiments, the method 300 may include generating 360 an entity-specific database query request for a search engine to perform a real time database search for additional entity-specific data associated with the at least one entity based at least in part on the plurality of entity-specific features in the uncompressed representation.

In some embodiments, the entity-specific database query request may have a search-engine-specific format for to query the specific search engine.

Figure 4A:
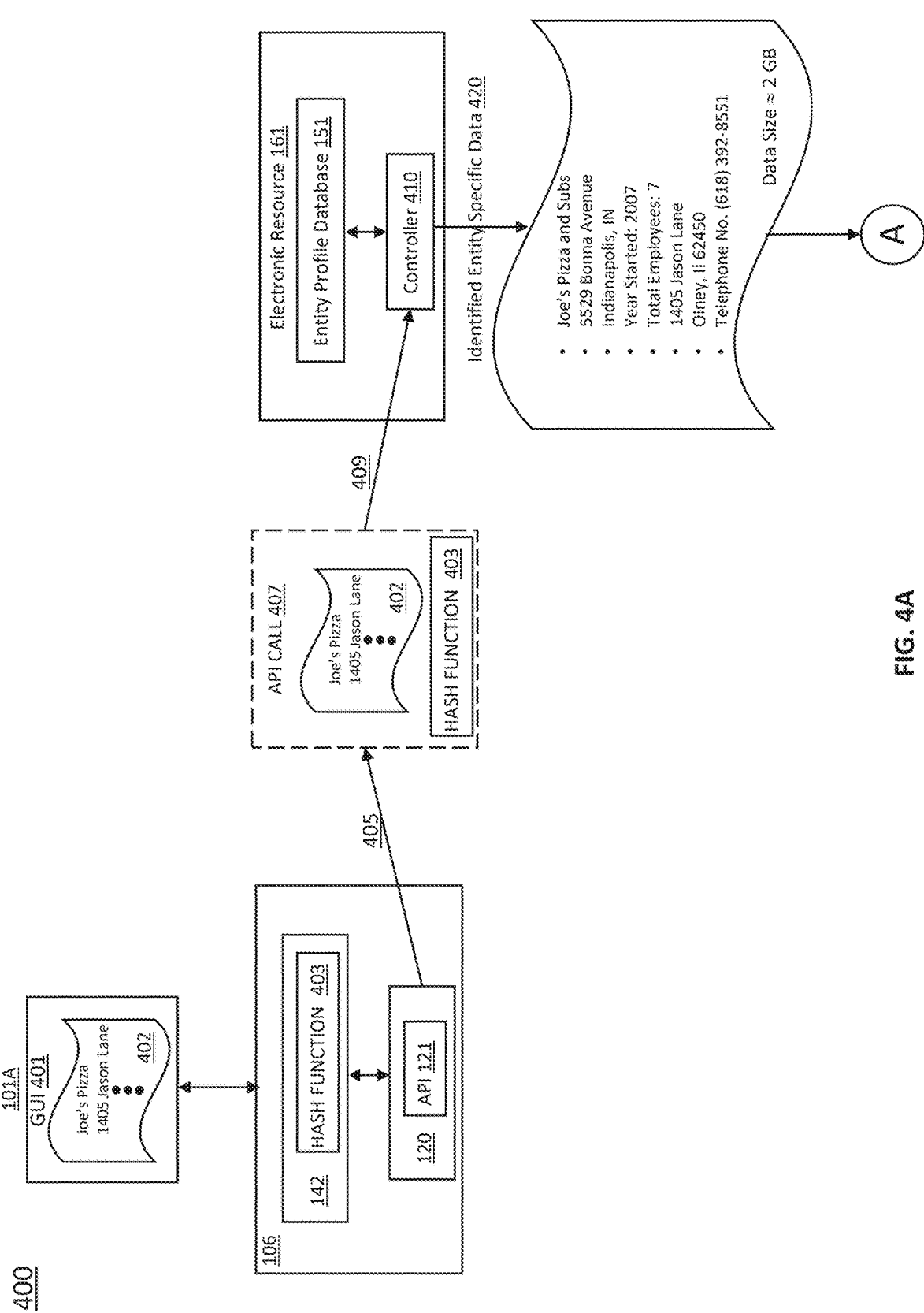
FIGS. 4A and 4B illustrate a flow diagram detailing a method for generating search queries for a search engine in accordance with one or more embodiments of the present disclosure.
Figure 4B:
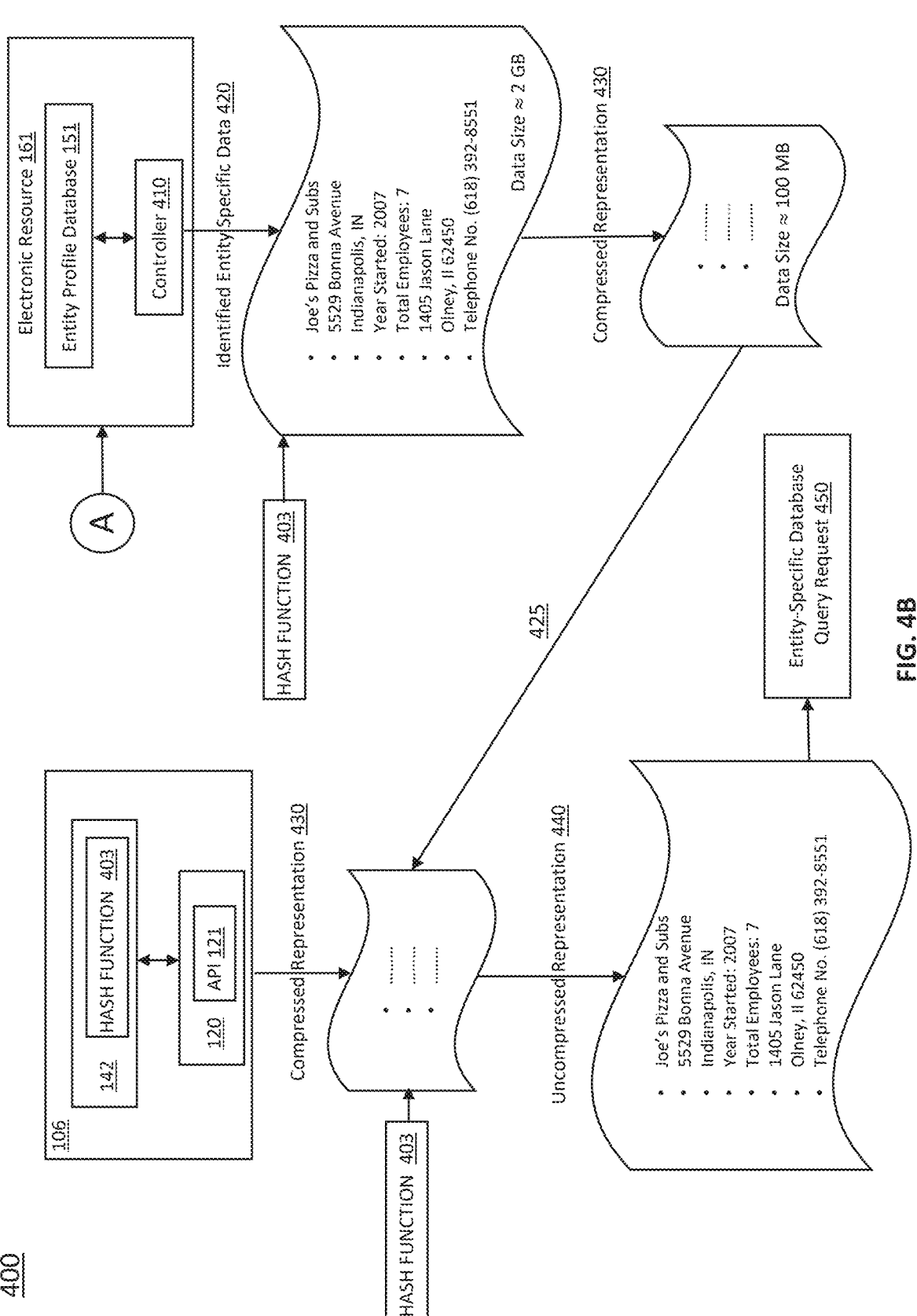

FIGS. 4A and 4B illustrate a flow diagram 400 detailing the method 300 for generating search queries for a search engine in accordance with one or more embodiments of the present disclosure.

In some embodiments, a user through one of the N user devices 101A . . . 101B such as for example user device 101A displaying a graphic user interface (GUI) 401, for example, may input via the GUI 401, an entity-specific data request 402 for entity-specific data. For example, the user may want to update the business profile of Joe's Pizza known to the user at 1405 Jason Lane. The illustrative RTER microservice platform 106 may receive the entity-specific data request for entity-specific data (e.g., any new business data about Joe's Pizza). An exemplary entity specific data request for Joe's Pizza may be shown for example in FIG. 2A.

In some embodiments, the at least one search query generator software module 142 may bundle 405 with the data from the entity specific data request 402, at least one data-size-reducing hash function 403 (also known as the hash function 403) in an API call 407. The API call 407 may be transmitted to a controller 410 of the electronic resource 161 from the plurality of electronic resources. The electronic resource 161 may include an entity profile database 151. The API call 407 may program the entity profile database 151 (e.g., the controller 410) to (1) identify entity-specific data in data records in the entity profile database 151 matching the entity-specific data in the entity-specific data request 402 associated with the at least one entity (e.g., Joe's Pizza), and (2) transmit to the RTER microservice platform 106 over the communication network, a compressed representation of the entity-specific data identified in the at least one entity profile database generated using the entity-specific data-size-reducing hash function 403.

In at least some embodiments, an illustrative entity-specific data-size-reducing hash function may be any function that may map data to fixed-size values called hash values, hash codes, digests, and/or simply hashes that may be stored in an indexed hash table. In at least some embodiments, an illustrative entity-specific data-size-reducing hash functions and their associated hash tables may be used in data storage that may require an amount of storage space only fractionally greater than the total space required for the data or records themselves.

In some embodiments, the at least one entity-specific data-size-reducing hash function may be configured to cluster entity-specific features from a plurality of entity-specific features substantially matching the entity-specific data associated with the at least one entity.

In some embodiments, identified entity-specific data 420 may be identified by the controller 410 in data records in the entity profile database 151. The identified entity-specific data 420 may have a large data size such as 2 GB for example. The controller 410 may apply the hash function 403 to the identified entity-specific data 420 to generate a compressed representation 430 of the identified entity-specific data 420. The compressed representation 430 may have, for example, a smaller data size of 100 MB. Note that the data size values of 2 GB and 100 MB are shown merely for conceptual clarity and not by way of limitation of the embodiments herein disclosed. The controller 410 may then transmit 425 the compressed representation 430 of the identified entity-specific data 420 to the at least one search query generator software module 142 in the RTER microservice platform 106 over the communication network.

In some embodiments, the at least one search query generator software module 142 may then apply to the compressed representation 430 of the identified entity-specific data 420, the hash function 403 (as shown in FIG. 4B), a decompression function based on the hash function, or both to receive an uncompressed representation 440 of the identified entity-specific data 420. However, the uncompressed representation 440 may include the similar features, but a lossier version of the identified entity-specific data.

In some embodiments, the at least one search query generator software module 142 may use the entity-specific data in the uncompressed representation 440 to generate an entity-specific database query request 450 for the search engine 165, such as ElasticSearch, for example, to query the plurality of databases 150A . . . 150B for additional entity-specific data associated with the at least one entity.

Note that the term entity-specific data from the search engine for the first exemplary flow for managing the search results may include the entity specific data from the search engine based on the query. For the second exemplary flow for managing the search results, the term entity-specific data may refer to both the initial entity-specific data from the initial entity database search using the API call 407 and/or the additional entity-specific data from the search engine using the generated entity-specific database query request 450 as shown in FIGS. 4A and 4B.

In some embodiments, the at least one entity-specific data-size-reducing hash function may be a locality sensitive hashing algorithm. Thus, the compressed representation 430 may include the plurality of entity-specific features respectively clustered into a plurality of feature buckets, where each feature bucket of the plurality of feature buckets may include matching entity-specific features from the plurality of entity-specific features. The RTER microservice platform 106 may be configured to generate the entity-specific database query request 450 for the search engine 165 to perform a real time database search based at least in part on the plurality of entity-specific features in the plurality of feature buckets in the uncompressed representation 440.

In some embodiments, feature bucketing may group features into discrete categories based on their value after hashing, for example mapping the features (names, addresses, etc.) into numerical values. For example, if there is a dataset with values ranging from 0 to 100, 10 exemplary equal-width buckets with 10 values may include (0-10, 10-20, 20-30, . . . ). Note that the bucketing does not need to be equal-width bucketing but may include any suitable bucketing scheme.

In some embodiments, the entity resolution microservice platform 106 may receive over the communication network, in response to transmitting the entity-specific database query request 450 to the search engine 165, search engine results data from the search engine that include the additional entity-specific data in additional entity-specific data records associated with the at least one entity.

In some embodiments, the entity resolution microservice platform 106 may update at least one entity profile in the entity profile database 151 for the at least one entity with the additional entity-specific data.

In some embodiments, the at least one entity may be a business. The at least one entity profile may be a profile of the business. The entity-specific data may include business data from the search engine associated with the business. Thus, the entity resolution microservice platform 106 may update the profile of the business with the business data received from the search engine 165.

In some embodiments, the entity resolution microservice platform 106 may receive the search engine results data comprising entity-specific data records. Each entity-specific data record may include a matching score. In other embodiments, the scoring module 140C may generate the matching score. The matching score may be indicative of a match between the entity-specific data in each entity-specific data record and the entity-specific data in the entity-specific database query request associated with the at least one entity.

For example, in the previous example described hereinabove illustrates the scoring module 140C assigning a matching score to each of the search results for the entity name in the entity-specific data based the entity name (Gil Ellis) in the entity-specific data request. However, the types of entity specific data are not limited to the entity name, but may also include the entity owner, the entity address etc. The search results may include search hits for each type of entity-specific data in the entity-specific data request that are each scored within each respective type of entity specific data. The search engine may receive search results hits for the different types of entity-specific data, each receiving a matching score. The search results hits for the different types of entity-specific data may be unordered.

In some embodiments, the entity resolution microservice platform 106 may perform an ordering of the entity-specific data for each type from a highest matching score to a lowest matching score and to store a secondary file of the search engine results data with entity-specific data records having a predefined number of highest matching scores. The secondary file may include the entity-specific data with the highest matching score for each given type so as to capture, for example, the search hit with the highest matching score for each type (e.g., the entity name, entity address, entity owner name, and the like).

In some embodiments, the predefined number of highest matching scores may include 10 search engine results with the highest matching scores. The predefined number of highest matching scores may include 100 search engine results with the highest matching scores. The predefined number of highest matching scores may include 500 search engine results with the highest matching scores. The predefined number of highest matching scores may include 1000 search engine results with the highest matching scores. The predefined number of highest matching scores may include 5000 search engine results with the highest matching scores. The predefined number of highest matching scores may include 10,000 search engine results with the highest matching scores.

In some embodiments, the entity resolution microservice platform 106 may generate an index for each entity-specific data record in the secondary file since the search results hits for the different types of entity-specific data may be unordered.

In some embodiments, the entity resolution microservice platform 106 may apply the same index during another search to the search engine results data for the entity-specific data associated with the at least one entity in response to another entity-specific data request that generates another entity-specific database query request for the search engine identical to the entity-specific database query request. (Note that the indexing may be applied to either of the first and second exemplary flows or both for managing the search results.)

FIGS. 1 through 4B illustrate systems and methods of generating search queries to execute a search using a search engine, such as ElasticSearch, for example, and efficiently managing a large number of search engine results. The embodiments disclosed herein provide technical solutions and technical improvements that overcome technical problems, drawbacks and/or deficiencies in the technical fields involving a typical search engine query sent to a search engine such as an ElasticSearch search query, for example, that may result in too much search data results (e.g., thousands of hits) being retrieved by the search engine to prevent a real-time update of the entity profile using the new or additional entity-specific data associated with the particular entity, if the search engine query does not limit search results hits.

As explained in more detail, above, technical solutions and technical improvements herein include aspects of generating an improved entity-specific database query request 450 that may be configured to reduce the number of search hits so as to facilitate a real-time update of the entity profile with the new or additional entity-specific data associated with the particular entity. Based on such technical features, further technical benefits become available to users and operators of these systems and methods. Moreover, various practical applications of the disclosed technology are also described, which provide further practical benefits to users and operators that are also new and useful improvements in the art.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11)

WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, exemplary inventive computer-based systems/platforms, exemplary inventive computer-based devices, and/or exemplary inventive computer-based components of the present disclosure may be configured to handle numerous concurrent users via the N user devices 16A and 16B that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999, 999,999,999), and so on.

In some embodiments, the illustrative computing devices and the illustrative computing components of the exemplary computer-based system 100 and platform 106 may be configured to manage a large number of members and concurrent transactions, as detailed herein. In some embodiments, the exemplary computer-based system 100 and platform 106 may be based on a scalable computer and network architecture that incorporates varies strategies for assessing the data, caching, searching, and/or database connection pooling.

In some embodiments, the N client (user) devices 101A through 101B may be personal computers, multiprocessor systems, microprocessor-based or programmable consumer electronics, network PCs, and the like. In some embodiments, one or more client devices within the N client devices 101A through 101B may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices !02 through !04 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that may be equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.).

In some embodiments, one or more client devices within the N client devices 101A through 101B may include may run one or more applications, such as Internet browsers, mobile applications, voice calls, video games, videoconferencing, and email, among others. In some embodiments, one or more client devices within the N client devices 101A through 101B may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices !02 through !04 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which may be remotely downloadable by the user using network protocols such as FTP, SSH, or other file transfer mechanisms. In some embodiments, a client device may provide several levels of user interface, for example, advance user, standard user. In some embodiments, one or more client devices within the N client devices 101A through 101B may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments and, optionally, in combination of any embodiment described above or below, for example, the N client devices 101A through 101B, and/or the exemplary platform 106 may include a specifically programmed software module in the service layer 130 that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

In some embodiments, the N client devices 101A through 101B as well as the I/O devices in the platform layer 110 may also include a number of external or internal devices such as a mouse, a CD-ROM, DVD, a physical or virtual keyboard, a display, or other input or output devices. In some embodiments, examples of the N client devices 101A through 101B as well as devices in the platform layer 110 may be any type of processor-based platforms that are connected to a network such as, without limitation, personal computers, digital assistants, personal digital assistants, smart phones, pagers, digital tablets, laptop computers, Internet appliances, and other processor-based devices. In some embodiments, client devices @02a through @02n may be specifically programmed with one or more application programs in accordance with one or more principles/methodologies detailed herein. In some embodiments, the N client devices 101A through 101B as well as devices in the platform layer 110 may operate on any operating system capable of supporting a browser or browser-enabled application, such as Microsoft™, Windows™, and/or Linux. In some embodiments, the N client devices 101A through 101B as well as devices in the platform layer 110 shown may include, for example, personal computers executing a browser application program such as Microsoft Corporation's Internet Explorer™, Apple Computer, Inc.'s Safari™, Mozilla Firefox, and/or Opera.

In some embodiments, at least one database of M exemplary databases 150A . . . 150B may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that may be stored.

In some embodiments, the exemplary inventive computer-based systems/platforms, the exemplary inventive computer-based devices, and/or the exemplary inventive computer-based components of the present disclosure may be specifically configured to operate in a cloud computing/ architecture such as, but not limiting to: infrastructure a service (IaaS), platform as a service (PaaS), and/or software as a service (SaaS) using a web browser, mobile app, thin client, terminal emulator or other endpoint.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that may be dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, etc.).

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

In some embodiments, the exemplary inventive computer-based systems/platforms, the exemplary inventive computer-based devices, and/or the exemplary inventive computer-based components of the present disclosure such as for example, the scoring module 140C, may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model, ii) Transfer the input data to the exemplary neural network model, iii) Train the exemplary model incrementally, iv) determine the accuracy for a specific number of timesteps, v) apply the exemplary trained model to process the newly-received input data, vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:

executing, by at least one processor, an entity resolution microservice that may be programmed to:

receive an entity-specific data request for entity-specific data associated at least one entity from a plurality of entities;

where entity-specific data for each of the plurality of entities may be stored in a plurality of databases;

transmit over a communication network, in response to the entity-specific data request, an application programming interface (API) call, including at least one entity-specific data-size-reducing hash function, to at least one entity profile;

where the at least one entity-specific data-size-reducing hash function may be configured to cluster entity-specific features from a plurality of entity-specific features substantially matching the entity-specific data associated with the at least one entity;

where the API call may program the at least one entity profile database to:

identify entity-specific data in data records in the at least one entity profile database matching the entity-specific data in the entity-specific data request associated with the at least one entity, and transmit to the entity resolution microservice over the communication network, a compressed representation of the entity-specific data identified in the at least one entity profile database generated using the at least one entity-specific data-size-reducing hash function;

receive the compressed representation from the at least one entity profile database;

transform the compressed representation to an uncompressed representation using the at least one entity-specific data-size-reducing hash function; and generate an entity-specific database query request for a search engine to perform a real time database search for additional entity-specific data associated with the at least one entity based at least in part on the plurality of entity-specific features in the uncompressed representation.

2. The method according to clause 1, where the at least one entity-specific data-size-reducing hash function may include a locality sensitive hashing algorithm, where the compressed representation may include the plurality of entity-specific features respectively clustered into a plurality of feature buckets, where each feature bucket of the plurality of feature buckets may include similar entity-specific features from the plurality of entity-specific features, and where the entity resolution microservice may be configured to generate the entity-specific database query request for the search engine to perform a real time database search based at least in part on the plurality of entity-specific features in the plurality of feature buckets in the uncompressed representation.

3. The method according to clause 1, where the search engine may be an ElasticSearch™ (Elasticsearch B.V, San Francisco, CA) search engine.

4. The method according to clause 1, where the entity resolution microservice may be further configured to receive over the communication network, in response to transmitting the entity-specific database query request to the search engine, search engine results data from the search engine including the additional entity-specific data in additional entity-specific data records associated with the at least one entity.

5. The method according to clause 4, where the entity resolution microservice may be further configured to update at least one entity profile in the at least one entity profile database for the at least one entity with the additional entity-specific data.

6. The method according to clause 5, where the at least one entity may be a business;

where the at least one entity profile may be a profile of the business;

where the additional entity-specific data may include additional business data from the search engine associated with the business; and where the entity resolution microservice may be configured to update the profile of the business with the additional business data received from the search engine.

7. The method according to clause 4, where the entity resolution microservice may be configured to receive the search engine results data comprising a list of the additional entity-specific data records;

where each additional entity-specific data record in the list may include a matching score;

where the matching score may be indicative of a match between the additional entity-specific data in each additional entity-specific data record and the entity-specific data in the entity-specific database query request associated with the at least one entity.

8. The method according to clause 7, where the entity resolution microservice may be configured to perform an ordering of the additional entity-specific data records in the list from a highest matching score to a lowest matching score; and store a secondary file of the search engine results data with additional entity-specific data records having a predefined number of highest matching scores.

9. The method according to clause 8, where the entity resolution microservice may be configured to generate an index for each additional entity-specific data record in the secondary file.

10. The method according to clause 9, where the entity resolution microservice may be configured to apply the index during another search to the search engine results data for the additional entity-specific data associated with the at least one entity in response to another entity-specific data request that generates another entity-specific database query request for the search engine identical to the entity-specific database query request.

11. A platform may include:

a plurality of processors; and a plurality of non-transient computer memories storing a plurality of computing instructions;

where, when executing the plurality of computing instructions, at least one processor from the plurality of processors may be programmed to execute an entity resolution microservice;

wherein the entity resolution microservice may be programmed to:

receive an entity-specific data request for entity-specific data associated at least one entity from a plurality of entities;

where entity-specific data for each of the plurality of entities may be stored in a plurality of databases;

transmit over a communication network, in response to the entity-specific data request, an application programming interface (API) call, including at least one entity-specific data-size-reducing hash function, to at least one entity profile database;

where the at least one entity-specific data-size-reducing hash function may be configured to cluster entity-specific features from a plurality of entity-specific features substantially matching the entity-specific data associated with the at least one entity;

where the API call may program the at least one entity profile database to:

identify entity-specific data in data records in the at least one entity profile database matching the entity-specific data in the entity-specific data request associated with the at least one entity, and transmit to the entity resolution microservice over the communication network, a compressed representation of the entity-specific data identified in the at least one entity profile database generated using the at least one entity-specific data-size-reducing hash function;

receive the compressed representation from the at least one entity profile database;

transform the compressed representation to an uncompressed representation using the at least one entity-specific data-size-reducing hash function;

generate an entity-specific database query request for a search engine to perform a real time database search for additional entity-specific data associated with the at least one entity based at least in part on the plurality of entity-specific features in the uncompressed representation.

12. The platform according to clause 11, where the at least one entity-specific data-size-reducing hash function may include a locality sensitive hashing algorithm;

where the compressed representation may include the plurality of entity-specific features respectively clustered into a plurality of feature buckets;

where each feature bucket of the plurality of feature buckets may include similar entity-specific features from the plurality of entity-specific features; and where the entity resolution microservice may be configured to generate the entity-specific database query request for the search engine to perform a real time database search based at least in part on the plurality of entity-specific features in the plurality of feature buckets in the uncompressed representation.

13. The platform according to clause 11, where the search engine may be an ElasticSearch search engine.

14. The platform according to clause 11, where the entity resolution microservice may be further configured to receive over the communication network, in response to transmitting the entity-specific database query request to the search engine, search engine results data from the search engine comprising the additional entity-specific data in additional entity-specific data records associated with the at least one entity.

15. The platform according to clause 14, where the entity resolution microservice may be further configured to update at least one entity profile for the at least one entity in the at least one entity profile database with the additional entity-specific data.

16. The platform according to clause 15, where the at least one entity may be a business;

where the at least one entity profile may be a profile of the business;

where the additional entity-specific data may include additional business data from the search engine associated with the business; and where the entity resolution microservice may be configured to update the profile of the business with the additional business data received from the search engine.

17. The platform according to clause 14, where the entity resolution microservice may be configured to receive the search engine results data comprising a list of the additional entity-specific data records;

where each additional entity-specific data record in the list may include a matching score; and where the matching score may be indicative of a match between the additional entity-specific data in each additional entity-specific data record and the entity-specific data in the entity-specific database query request associated with the at least one entity.

18. The platform according to clause 17, where the entity resolution microservice may be configured to perform an ordering of the additional entity-specific data records in the list from a highest matching score to a lowest matching score; and store a secondary file of the search engine results data with additional entity-specific data records having a predefined number of highest matching scores.

19. The platform according to clause 18, where the entity resolution microservice may be configured to generate an index for each additional entity-specific data record in the secondary file.

20. The platform according to clause 19, where the entity resolution microservice may be configured to apply the index during another search to the search engine results data for the additional entity-specific data associated with the at least one entity in response to another entity-specific data request that generates another entity-specific database query request for the search engine identical to the entity-specific database query request.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method, comprising:

executing, by at least one processor, at least one entity resolution microservice (ESM) that is programmed to:

transmit over a communication network, in response to at least one entity-specific data request for entity-specific data associated with at least one entity, at least one application programming interface (API) call, comprising a transmit payload, to at least one entity profile database;

wherein the at least one API call is configured to program the at least one entity profile database to send at least one entity profile database record back to the ESM, the at least one entity profile database record is compressed, using at least one entity-specific data-size-reducing hash function identified in the transmit payload, to form at least one compressed database record representation;

wherein the at least one entity profile database record comprises at least one entity specific feature from a plurality of entity-specific features that matches the entity-specific data within a predetermined similarity threshold; and generate at least one entity-specific database query request for a search engine to perform at least one real time database search for additional entity-specific data associated with the at least one entity based at least in part on the at least one entity profile database record extracted from the at least one compressed database record representation using the at least one entity-specific data-size-reducing hash function.

2. The method according to claim 1, wherein the at least one entity-specific data-size-reducing hash function comprises a locality sensitive hashing algorithm;

wherein the at least one compressed database record representation comprises the plurality of entity-specific features respectively clustered into a plurality of feature buckets;

wherein each feature bucket of the plurality of feature buckets comprises similar entity-specific features from the plurality of entity-specific features; and wherein the at least one entity resolution microservice is configured to generate the at least one entity-specific database query request for the search engine to perform a real time database search based at least in part on the plurality of entity-specific features in the plurality of feature buckets in an uncompressed representation.

3. The method according to claim 1, wherein the search engine is an ElasticSearch search engine.

4. The method according to claim 1, wherein the at least one entity resolution microservice is further configured to receive over the communication network, in response to transmitting the at least one entity-specific database query request to the search engine, search engine results data from the search engine comprising the additional entity-specific data in additional entity-specific data records associated with the at least one entity.

5. The method according to claim 4, wherein the at least one entity resolution microservice is further configured to update at least one entity profile in the at least one entity profile database for the at least one entity with the additional entity-specific data.

6. The method according to claim 5, wherein the at least one entity is a business;

wherein the at least one entity profile is a profile of the business;

wherein the additional entity-specific data comprises additional business data from the search engine associated with the business; and wherein the at least one entity resolution microservice is configured to update the profile of the business with the additional business data received from the search engine.

7. The method according to claim 4, wherein the at least one entity resolution microservice is configured to receive the search engine results data comprising a list of the additional entity-specific data records;

wherein each additional entity-specific data record in the list comprises a matching score;

wherein the matching score is indicative of a match between the additional entity-specific data in each additional entity-specific data record and the entity-specific data in the at least one entity-specific database query request associated with the at least one entity.

8. The method according to claim 7, wherein the at least one entity resolution microservice is configured to perform an ordering of the additional entity-specific data records in the list from a highest matching score to a lowest matching score; and store a secondary file of the search engine results data with the additional entity-specific data records having a predefined number of highest matching scores.

9. The method according to claim 8, wherein the at least one entity resolution microservice is configured to generate an index for each additional entity-specific data record in the secondary file.

10. The method according to claim 9, wherein the at least one entity resolution microservice is configured to apply the index during another search to the search engine results data for the additional entity-specific data associated with the at least one entity in response to another entity-specific data request that generates another entity-specific database query request for the search engine identical to the at least one entity-specific database query request.

11. A platform, comprising:

a plurality of processors; and a plurality of non-transient computer memories storing a plurality of computing instructions;

wherein, when executing the plurality of computing
instructions, at least one processor from the plurality
of processors is programmed to execute an entity
resolution microservice;
wherein the entity resolution microservice (ESM) is programmed to:
transmit over a communication network, in response to
at least one entity-specific data request for entity-
specific data associated with at least one entity, at
least one application programming interface (API)
call, comprising a transmit payload, to at least one
entity profile database;
wherein the at least one API call is configured to
program the at least one entity profile database to
send at least one entity profile database record
back to the ESM, the at least one entity profile
database record is compressed, using at least one
entity-specific data-size-reducing hash function
identified in the transmit payload, to form at least
one compressed database record representation;
wherein the at least one entity profile database record
comprises at least one entity specific feature from
a plurality of entity-specific features that matches
the entity-specific data within a predetermined
similarity threshold; and
generate at least one entity-specific database query
request for a search engine to perform at least one
real time database search for additional entity-spe-
cific data associated with the at least one entity based
at least in part on the at least one entity profile
database record extracted from the at least one
compressed database record representation using the
at least one entity-specific data-size-reducing hash
function.
12. The platform according to claim 11, wherein the at least one entity-specific data-size-reducing hash function
comprises a locality sensitive hashing algorithm;
wherein the at least one compressed database record
representation comprises the plurality of entity-specific
features respectively clustered into a plurality of feature
buckets;
wherein each feature bucket of the plurality of feature
buckets comprises similar entity-specific features from
the plurality of entity-specific features; and
wherein the entity resolution microservice is configured to
generate the at least one entity-specific database query
request for the search engine to perform a real time
database search based at least in part on the plurality of
entity-specific features in the plurality of feature buck-
ets in an uncompressed representation.
13. The platform according to claim 11, wherein the entity
resolution microservice is further configured to receive over
the communication network, in response to transmitting the
at least one entity-specific database query request to the
search engine, search engine results data from the search
engine comprising the additional entity-specific data in
additional entity-specific data records associated with the at
least one entity.
14. The platform according to claim 13, wherein the
resolution microservice is further configured to update at least one entity profile for the at least one entity in the at least
one entity profile database with the additional entity-specific
data.
15. The platform according to claim 14, wherein the at
least one entity is a business;
wherein the at least one entity profile is a profile of the
business;

26 wherein the additional entity-specific data comprises
additional business data from the search engine asso-
ciated with the business; and
wherein the entity resolution microservice is configured to
update the profile of the business with the additional
business data received from the search engine.
16. The platform according to claim 13, wherein the entity
resolution microservice is configured to receive the search
engine results data comprising a list of the additional entity-
specific data records;
wherein each additional entity-specific data record in the
list comprises a matching score; and
wherein the matching score is indicative of a match
between the additional entity-specific data in each
additional entity-specific data record and the entity-
specific data in the at least one entity-specific database
query request associated with the at least one entity.
17. The platform according to claim 16, wherein the entity
resolution microservice is configured to perform an ordering
of the additional entity-specific data records in the list from
a highest matching score to a lowest matching score; and
store a secondary file of the search engine results data
with the additional entity-specific data records having a
predefined number of highest matching scores.
18. The platform according to claim 17, wherein the entity
resolution microservice is configured to generate an index
for each additional entity-specific data record in the second-
ary file.
19. The platform according to claim 18, wherein the entity
resolution microservice is configured to apply the index
during another search to the search engine results data for
the additional entity-specific data associated with the at least
one entity in response to another entity-specific data request
that generates another entity-specific database query request
for the search engine identical to the entity-specific database
query request.
20. A non-transitory computer-readable medium having
executable instructions stored thereon, the executable
instructions being configured to cause at least one processor
to perform a method comprising:
executing at least one entity resolution microservice
(ESM) that is programmed to:
transmit over a communication network, in response to
at least one entity-specific data request for entity-
specific data associated with at least one entity, at
least one application programming interface (API)
call, comprising a transmit payload, to at least one
entity profile database;
wherein the at least one API call is configured to
program the at least one entity profile database to
send at least one entity profile database record
back to the ESM, the at least one entity profile
database record is compressed, using at least one
entity-specific data-size-reducing hash function
identified in the transmit payload, to form at least
one compressed database record representation;
wherein the at least one entity profile database record
comprises at least one entity specific feature from
a plurality of entity-specific features that matches
the entity-specific data within a predetermined
similarity threshold; and
generate at least one entity-specific database query
request for a search engine to perform at least one
real time database search for additional entity-spe-
cific data associated with the at least one entity based
at least in part on the at least one entity profile
database record extracted from the at least one compressed database record representation using the at least one entity-specific data-size-reducing hash function.

\* \* \* \* \*